Oct. 21, 1958      D. K. JOVANOVICH      2,856,788
HELICOPTER CONTROL MECHANISM
Filed Oct. 26, 1953
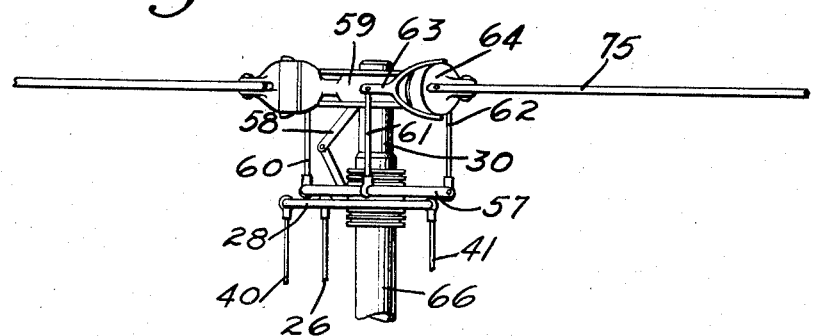
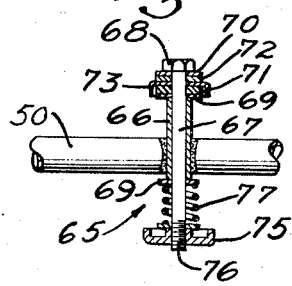
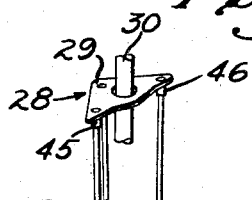
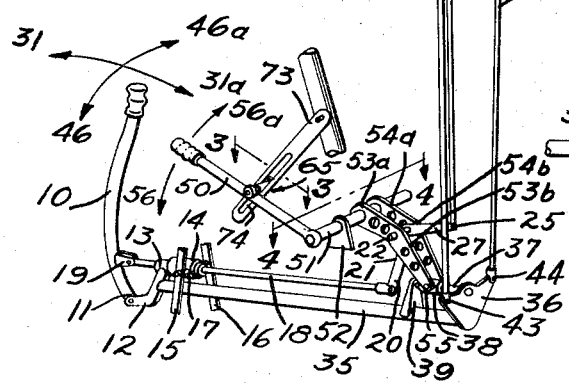
Drago K. Jovanovich
INVENTOR.
BY William W. Hayflger
Agent

United States Patent Office 2,856,788
Patented Oct. 21, 1958

2,856,788

HELICOPTER CONTROL MECHANISM

Drago K. Jovanovich, Pacific Palisades, Calif., assignor, by mesne assignments, of 53.07777 percent to D. K. Jovanovich, as trustee, 26.20439 percent to Francis I. Daly, Jr., as trustee, and 20.71784 percent to Frank J. Kozloski Application October 26, 1953, Serial No. 388,309

3 Claims. (Cl. 74—469)

This invention relates to helicopter rotor blade pitch control mechanisms, and more particularly to pitch control mechanisms in which two pilot operated members are enabled to control and regulate the pitch angles of the rotor blades, both cyclically and collectively.

In contemporary helicopters it is the generally accepted practice to control the pitch angles of the rotating blades by providing a so-called swashplate and rotating spider mechanism, the former being operatively connected to the pilot operated control mechanism, and the latter being operatively connected to the blades. Control rods or cables extend from the pilot operated control mechanism to the non-rotating swashplate and govern its angular inclination and axial position relative to the rotor shaft axis. The spider, which is operatively connected to the individual blades, is usually journaled to rotate on and with respect to the swashplate enabling it to duplicate the relative position and angular inclination of the swashplate in order to transmit the angular inclination and positioning thereof to the blades rotating about the rotor axis, and thereby to govern the pitch angles thereof. The characteristics of the pilot operated control mechanism which govern the swashplate inclination and position must be such that the resultant movements of the swashplate accurately and almost instantaneously follow the movements of the pilot control sticks, taking into account the requirement that the final swashplate position and inclination is the result of movements of both the collective and cyclic pilot control sticks. Stated another way, the pilot actuated control mechanism must be able to superimpose or integrate movements of both pilot operated sticks and to effect transmission of these movements to the swashplate in such a way that response to stick movements will be quick, accurate, and dependable.

With the foregoing in mind, I have made it a principal object of my invention to provide a novel pilot operated control system in which the number of moving or movable components are reduced to a minimum and co-act in operation in a new and different manner so as to decrease the total weight or mass of the control system and to facilitate ease of operation of the control system and accurateness of response thereof.

It is another object of my invention to provide a novel arrangement and combination of control system components the operation of which is such as to allow the system components to be raised and lowered as a group by the collective pitch stick in order to effect similar swashplate movement, without diminishing the effectiveness of operation of the same control system components in response to cyclic pitch stick movements.

It is another object of my invention to provide in a helicopter control system, in which the system components themselves may be raised and lowered collectively, a novel friction damping means for resisting collective movement of the control system components to the extent necessary to prevent the weight or mass of the controls from acting to raise or lower the swashplate position during vertical acceleration of the helicopter or as the result of the action of the force of gravity of these masses.

Other objects and advantages of my invention will be apparent in the following description and claims considered together with the accompanying drawings forming an integral part of this specification and in which;

Fig. 1 is a perspective view of the preferred embodiment of the invention;

Fig. 2 is an elevational view of the rotor head of a helicopter illustrating the usual arrangement of swashplate, spider, control rods, and rotor blades;

Fig. 3 is a sectional view of the friction damping mechanism illustrated in Fig. 1, and taken on line 3—3 thereof; and Fig. 4 is a plan view of a portion of the pilot operated control system illustrated in Fig. 1, and taken on line 4—4 thereof.

Referring now to the drawings and specifically to Fig. 1, the preferred pilot operated control system illustrated includes a pilot control stick 10, which is pivotally attached at the lower end portion 11 thereof to an arm or bracket 12 extending upwardly and rearwardly and rigidly joined to a tubular member such as bearing sleeve 13 located rearwardly of stick 10. Sleeve 13 is journaled to rotate within housing member 14, which is pivotally suspended between frame members 15 and 16 by means of trunnions 17. Connection means such as push pull or control rod 18 extends through sleeve 13 in a longitudinal direction, and the forward end thereof is operatively connected to stick 10 at a point 19 above pivot 11. The opposite or rearward end of rod 18 is swivelly and pivotally connected to one arm 20 of a longitudinally pivoted member such as the bell crank or lever member 21 which is swung or pivotally mounted on a pin 22 extending transversely with respect to control rod 18 and spaced upwardly therefrom.

The lower end 25 of a second push-pull or control rod 26 is operatively or pivotally joined to a second arm 27 of the bell crank member 21, rod 26 extending upwardly toward swashplate 28. The upper end of rod 26 is pivotally joined to the portion 29 of the swashplate lying forwardly of vertical rotor shaft 30, about which the swashplate is centered. The swashplate itself may be tiltably mounted on rotor shaft 30 in various well known ways, and is adapted to be tilted longitudinally or laterally, and in addition to be shifted upwardly or downwardly along the rotor shaft 30.

When pilot control stick 10 is pushed longitudinally forwardly in the direction of arrowhead 31, push-pull rod 18 will be pulled forwardly through guide sleeve 13, and as a result downwardly extending bell crank arm 20 will pivot forwardly, and rearwardly extending bell crank arm 27 will pivot downwardly. The motion of arm 27 will cause control rod 26 to be moved downwardly, and as a result the forward portion of the swashplate to which the rod 26 is operatively attached will also be pivoted downwardly.

When the pilot control stick 10 is pulled longitudinally rearwardly, the control rod 18 will also move rearwardly causing bell crank arms 20 and 27 to pivot rearwardly and upwardly, respectively, and causing the forward portion 29 of swashplate 28 to tilt upwardly about a transverse axis perpendicular to the rotor shaft. Thus the mechanism described constitutes a control means for pivoting the swashplate longitudinally.

The swashplate is adapted to be pivoted laterally by the cyclic pitch control stick 10 and other control mechanism to be presently described. The arm 12 to which stick 10 is pivotally connected has a laterally swingable torque bar 35 rigidly joined thereto. The torque bar 35 extends rearwardly from arm 12 beneath control rod 18, and the rearward end of bar 35 has rigidly attached thereto a fulcrum lever 36. Member 36 pivots about the longitudinal axis of a pin 37 to which member 36 is attached. The axis of pin 37 is offset from arm 35 and is spaced upwardly therefrom so that it is axially aligned with the sleeve 13. The pin extends forwardly from lever member 36, passes through guide bearing 38, and the forward end of the pin is attached to arm or bracket 39 which is carried by swingable arm 35.

Rods 40 and 41 for connecting lever 36 to swash plate 28 are positioned on opposite sides of the rotor drive shaft 30 and spaced laterally therefrom. Similarly, the operative connections 43 and 44 between the rods 40 and 41 and the lever member 36 lie on opposite sides of pin 37 and are spaced equal distances therefrom; and the connection 45 and 46 between the rods 40 and 41 and the swashplate 28 lie on opposite sides of rotor shaft 30 and are spaced equal distances therefrom.

In operation, when control stick 10 is moved leftwardly in the direction of arrowhead 46, it will pivot about the axis of control rod 18, causing the lower end 11 of the stick 10, the lever 12, and the bar 35 to swing rightwardly. The bearing sleeve 13 will correspondingly rotate counterclockwise in housing member 14 since the sleeve is attached to link member 12. Rightward displacement of bar 35 will cause the bell crank 36, pin 37, and arm 39 to rotate counterclockwise about the axis of guide bearing 38. Thus the control rod 40 will be pulled downwardly by bell crank 36 and rod 41 will be moved upwardly, causing the swashplate 28 to tilt laterally in the counterclockwise direction about a longitudinal axis through the swashplate 30. Similarly, when the cyclic control stick is moved rightwardly, swashplate 28 is tilted rightwardly or clockwise about the longitudinal axis therethrough.

The swashplate 28 is adapted to be moved vertically along the axis of the rotor shaft 26 by collective pitch stick 50 and other control mechanism operatively connected thereto. The latter includes the laterally disposed shaft 51, mounted to pivot in support member 52, and to which there are fixedly attached two parallel lever members 53 and 54. The latter include rearwardly extending legs 53a and 54a, and downwardly extending legs 53b and 54b. Legs 53b and 54b pivotally support the guide bearing 38 by means of trunnions 55, which extend rightwardly and leftwardly from opposite sides of bearing 38 and pivotally engage the legs 53b and 54b. The lateral pin 22 pivotally supporting bell crank 22 is itself supported by intermediate portions of lever members 53 and 54 in such a position that bell crank 21 is positioned forwardly of bell crank 36. Thus the two bell cranks, whose axes are disposed at right angles relative to one another, are pivotally supported by separate control mechanism operatively connected to pilot control stick 50. Also, since bell crank 21 is supported by pin 22 at the rearward extremity of approximately horizontal legs 53a and 54a, it will be seen that a few degrees upward pivoting of levers 53 and 54 about the axis of shaft 51 will effect only an upward displacement of bell crank 21, with a minimum of rotation imparted thereto by control rod 18. This is due to the fact that control rod 18 is disposed approximately parallel with respect to leg portions 53a and 54a of levers 53 and 54, and also because control rod 18 may pivot upwardly about the axis of trunnions 17.

In operation when collective pitch stick 50 is moved downwardly in the direction of arrowhead 56, the two supporting levers 53 and 54 are pivoted upwardly, carrying the bell cranks 21 and 36 upwardly and thereby moving all three control rods 26, 40 and 41 and swashplate 28 upwardly an equal amount. Likewise, when collective pitch stick is moved upwardly, swashplate 28 is moved downwardly along the rotor shaft axis, without changing the inclination thereof with respect to the rotor shaft 30.

The spider mechanism 57 which is rotatably mounted on the swashplate 28 by ball bearings, not shown, is usually driven in rotation by scissor link 58 which is operatively connected to the rotor head 59. The spider mechanism therefore necessarily rotates with the rotor head, and is adapted to control the pitch angles of the rotating blades through the three connecting rods or links 60, 61 and 62. Each of these links extends vertically upwardly and is operatively connected to a rotor blade pitch arm 63, which is connected to the pitch bearing housing 64 and extends rearwardly therefrom with respect to the blade 75. The rotor blade 75 is itself joined to the pitch bearing housing.

The swashplate 28 is mounted on a ball-type bearing, not shown, on the sleeve 66, which is axially slidable with respect to rotor shaft 30. When swashplate 28 is moved axially with respect to shaft 30 or inclined thereto by means of control rods 26, 40 and 41, the rotating spider mechanism 57 will move with the swashplate and assume the inclination thereof, causing the connecting links 60, 61 and 62 to move upwardly or downwardly in accordance with the angular disposition of the swashplate. Thus, the pitch angles of the rotor blades are dynamically governed by the swashplate position and inclination, which is in turn governed by the pilot control sticks 10 and 50 and the control mechanism operatively connected thereto.

Since the bell cranks 20 and 36 and associated control mechanism are carried by levers 53 and 54 which are swung about the axis of lateral shaft 51, the weight thereof plus the weight of control rods 26, 40, 41, swashplate 28, spider 57, and sleeve 66 will tend to pull the swashplate downwardly, increasing the pitch angles of the blades. To preclude this circumstance, there is provided a friction damping mechanism 65 which is joined to the collective pitch stick 50 as by welding it thereto. The friction damping mechanism may be of various types, provided it is adjustable. The mechanism provided includes a sleeve 66 fastened to the control stick and lying transversely thereto, and a bolt 67 extending through the sleeve. Between the head 68 of the bolt and one end of the sleeve there are positioned two washers 69 and 70 between which there is positioned a pair of friction discs 71 and 72. A channeled arm 73 swung from the structure of the helicopter provides the reaction structure against which the friction discs bear. Arm 73 has a slot 74 formed lengthwise therein, and the bolt 67 passes through the slot. The friction discs lie on opposite sides of the arm. Between the opposite end of the sleeve 66 and a knob 75 threadedly engaging the end 76 of the bolt is another washer 69 and a compression spring 77.

To adjust the amount of frictional resistance to sliding offered by the engagement between the discs 71 and 72 and the arm 73, the knob 75 is tightened or loosened so as to increase or decrease the compression force exerted by the spring 77. It will be seen that the proper amount of resistance to sliding offered by the friction damping mechanism corresponds to a force which is great enough to prevent the weight of the pilot control system components plus inertia forces arising from the masses thereof during vertical acceleration from causing changes in the pitch angles of the rotor blades. The pilot may easily adjust the control knob 75 to achieve the proper friction in the damping mechanism during vertical acceleration. On the other hand, the resistance to sliding offered by the damping mechanism must not be so great as to inconvenience the pilot when he desires to move the collective pitch stick 50 upwardly or downwardly to change the collective pitch angles of the rotor blades and thereby increase or decrease the vertical lift forces exerted by the rotor blades. It is thus apparent that the pilot may readily adjust the amount of resistance to movement of the collective pitch stick 50 offered by the mechanism 65 to that value which gives him the proper "feel" of the controls and which therefore contributes to skillful control and operation of the helicopter.

From the foregoing, it will be apparent that the pilot control mechanism provided operates to control the swashplate and rotor blade pitch angles in a novel way with a minimum of movable components and therefore minimum weight, thereby materially contributing to quick, dependable response of the control system and swashplate mechanism to movements of the pilot control sticks.

I claim:

1. In a helicopter rotor blade pitch control mechanism: a swash plate adapted to control the pitch angles of the rotor blades, said swash plate being universally tiltable and vertically translatable; a rod extending down from said swash plate for the fore and aft tilting of the same; a pair of rods connected to and extended downwardly from the opposite sides of said swash plate for tilting the same laterally; means connected to the lower end of said rod to raise and lower the same to effect fore and aft tilting of said swash plate; means for moving said rods of said pair of rods vertically in opposite directions to effect laterally tilting of said swash plate; means selectively operable to simultaneously raise and lower all of said rods so as to shift said swash plate vertically without changing the tilt thereof, said last named means comprising a vertically adjustable member, a lever pivotally supported on said vertically adjustable member, said lever being connected to the lower end of said rod so that swinging of said lever will effect vertical movement of said rod, and a fulcrum lever pivotally supported on said vertically adjustable member, means connecting the lower ends of said pair of rods to the opposite ends of said fulcrum lever; means for independently swinging said lever so as to accomplish selective vertical movements of said rods; and means for adjusting said vertical adjustable member so as to simultaneously move all of said rods either upwardly or downwardly.

2. In a helicopter rotor blade pitch control mechanism: a swash plate adapted to control the pitch angles of the rotor blades, said swash plate being universally tiltable and vertically translatable; a rod extending down from said swash plate for the fore and aft tilting of the same; a pair of rods connected to and extended downwardly from the opposite sides of said swash plate for tilting the same laterally; a vertically adjustable member arranged at the lower ends of said rods; transverse pivot means on said member; a bell crank lever swingable on said pivot means, one end of said lever being connected to the lower end of said first named rod to vertically move the same; pilot operated means for swinging said lever; a fulcrum lever pivotally connected to said member so as to swing around a longitudinal axis, the ends of said fulcrum lever being connected to the lower ends of said pair of rods; pilot operable means for swinging said fulcrum lever so as to effect a lateral tilting of said swash plate; and means for raising and lowering said vertically adjustable member so as to simultaneously move all of said rods in the same vertical direction.

3. A control mechanism as defined in claim 2 wherein said means for swinging said fulcrum lever comprises a torque bar extending along said longitudinal axis, wherein said pilot operable means comprises a control lever pivotally connected to said torque bar so that it can swing forwardly and rearwardly relative to said torque bar, lateral swinging of said control lever causing rotation of said torque bar around said longitudinal axis and swinging of said fulcrum lever, and wherein said means for swinging said bell crank lever comprises a link extending along said longitudinal axis and connecting said control lever to the remaining end of said bell crank lever.

References Cited in the file of this patent

UNITED STATES PATENTS

| | | |
|---|---|---|
| 2,441,212 | Schenk | May 11, 1948 |
| 2,445,550 | Wotton | July 20, 1948 |
| 2,509,313 | Pullin | May 30, 1950 |
| 2,514,212 | Jennings | July 4, 1950 |
| 2,521,806 | Roman | Sept. 12, 1950 |
| 2,599,690 | Buivid et al. | June 10, 1952 |
| 2,629,452 | Alex | Feb. 24, 1953 |
| 2,642,143 | Miller | June 16, 1953 |

FOREIGN PATENTS

| | | |
|---|---|---|
| 1,009,222 | France | Mar. 5, 1952 |